US012000957B2

(12) United States Patent
Lesi et al.

(10) Patent No.: US 12,000,957 B2
(45) Date of Patent: Jun. 4, 2024

(54) RANGE DOPPLER CONSISTENCY CHECK FOR RADAR GHOST TARGET DETECTION

(71) Applicant: Intel Corporation, Santa Clara, CA (US)

(72) Inventors: Vuk Lesi, Cornelius, OR (US); Shabbir Ahmed, Beaverton, OR (US); Christopher Gutierrez, Hillsboro, OR (US); Wen-Ling Huang, Los Altos, CA (US); Marcio Juliato, Portland, OR (US); Saiveena Kesaraju, Mountain View, CA (US); Manoj Sastry, Portland, OR (US); Ivan Simoes Gaspar, West Linn, OR (US); Qian Wang, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 385 days.

(21) Appl. No.: 17/357,291

(22) Filed: Jun. 24, 2021

(65) Prior Publication Data
US 2021/0318414 A1    Oct. 14, 2021

(51) Int. Cl.
*G01S 7/41* (2006.01)
*G01S 13/56* (2006.01)
*G01S 13/931* (2020.01)

(52) U.S. Cl.
CPC ............ *G01S 7/415* (2013.01); *G01S 13/56* (2013.01); *G01S 13/931* (2013.01); *G01S 2013/9321* (2013.01)

(58) Field of Classification Search
CPC ........ G01S 7/415; G01S 13/56; G01S 13/931; G01S 2013/9321
See application file for complete search history.

(56) References Cited

U.S. PATENT DOCUMENTS

| 10,275,955 | B2* | 4/2019 | Gupta ................... B60W 50/14 |
| 2014/0005908 | A1* | 1/2014 | Kollberg ............... G01S 13/726 |
| | | | 701/96 |
| 2017/0307749 | A1* | 10/2017 | Shimizu ................. G08G 1/166 |
| 2018/0341012 | A1* | 11/2018 | Takada .................... G01S 7/414 |
| 2021/0163000 | A1* | 6/2021 | Dieckmann ........... G01S 13/931 |

(Continued)

FOREIGN PATENT DOCUMENTS

| JP | 2007304069 | * 11/2007 |
| JP | 2007304069 A | 11/2007 |

(Continued)

OTHER PUBLICATIONS

International Search Report and Written Opinion for the International Patent Application No. PCT/US2022/021863, dated Jul. 13, 2022, 8 pages.

*Primary Examiner* — James R Hulka
*Assistant Examiner* — Noah Y. Zhu
(74) *Attorney, Agent, or Firm* — KDW Firm PLLC (57) ABSTRACT

Systems, apparatuses, and methods to response to distinguish a ghost target from an actual target based on radar signals and ranges determined from the radar signals. In particular, the disclosure provides an intrusion detection system receiving ranges and velocities for targets detected based on radar signals, determining a potential ghost target from the received velocities and confirming the potential ghost target based on estimated ranges and perturbations of the vehicle speed.

21 Claims, 8 Drawing Sheets

(56) References Cited

U.S. PATENT DOCUMENTS

2022/0011423 A1\* 1/2022 Li .......................... G01S 7/023
2022/0163649 A1\* 5/2022 Li .......................... G01S 7/354

FOREIGN PATENT DOCUMENTS

| JP | 2016075524 A | | 5/2016 |
|---|---|---|---|
| JP | 2019105478 | \* | 6/2019 |
| JP | 2020197506 A | | 12/2020 |

\* cited by examiner

RANGE DOPPLER CONSISTENCY CHECK FOR RADAR GHOST TARGET DETECTION

BACKGROUND

Modern vehicles often include range sensing technologies. For example, modern vehicles can include radar sensing components to provide automated braking assistance, collision avoidance, or the like as part of an autonomous driving or safety package.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments of the present disclosure provide for identifying "ghosts" detected as valid objects by a radar system. For example, in the case of a vehicle, the present disclosure provides to identify false detections or detections resulting from a malicious attempt to cause the radar system to detect an object where no object exists.

In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

Figure 1A:
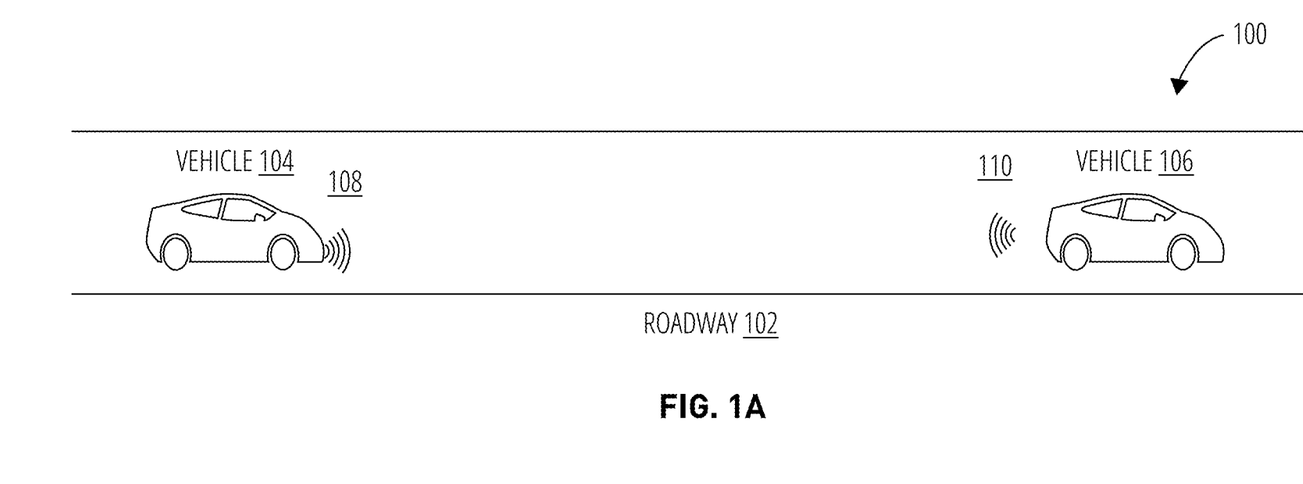
FIG. 1A illustrates an environment 100, in accordance with non-limiting example(s) of the present disclosure.
Figure 1B:
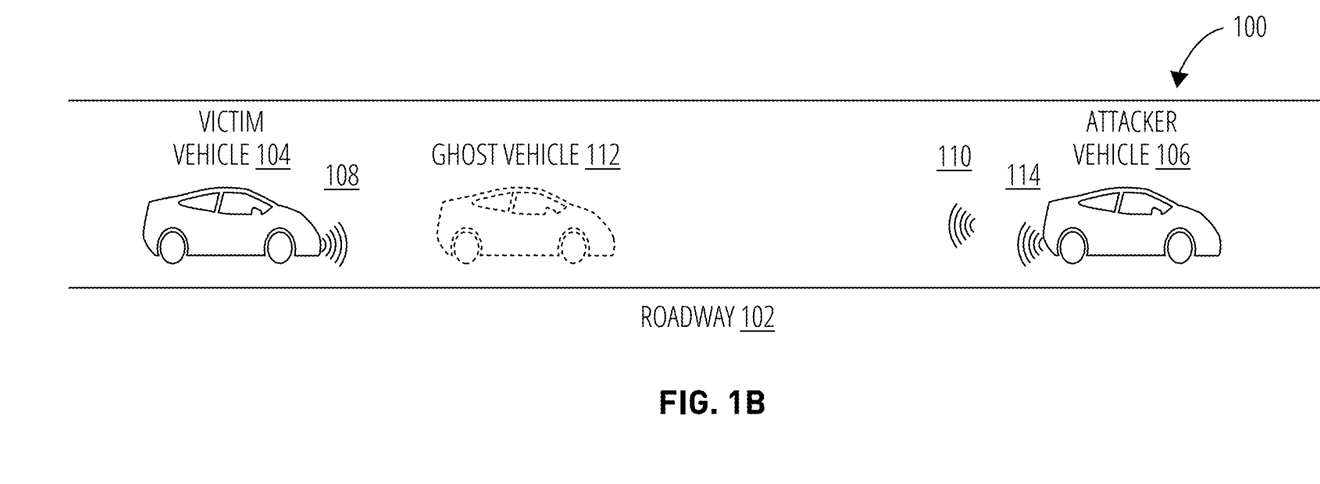
FIG. 1B illustrates the environment 100 including a ghost vehicle 112, in accordance with non-limiting example(s) of the present disclosure.

FIG. 1A and FIG. 1B depict an environment 100, in accordance with non-limiting example(s) of the present disclosure. The environment 100 includes a roadway 102 upon which vehicles can travel. For example, vehicle 104 and 106 are depicted. It is noted that a car is depicted in this and other figures herein. However, this is done for purposes of convenience and not to be limiting. That is, vehicles 104 and/or 106 could be another type of machine such as, a motorcycle, an airplane, a boat, or the like.

Vehicles 104 and 106 include a range sensing system (e.g., refer to FIG. 2) arranged to identify objects (e.g., other vehicles, humans, stationary objects, etc.) and/or determine range to the object(s). In a most basic system, vehicle 104 can be arranged to detect objects in front of vehicle 104 and determine whether the object is within a threshold distance based on signal 108 and reflection 110. In a more advanced system, vehicle 104 can be arranged to detect a number of objects adjacent to (e.g., in front, to the side, behind, etc.) vehicle 104 and can determine a distance to the detected objects based on signal 108 and reflection 110.

Such range sensing systems are susceptible to malicious attacks. For example, FIG. 1B depicts vehicle 104 as victim vehicle 104 and vehicle 106 and attacker vehicle 106. During a malicious attack, attacker vehicle 106 can transmit an attacker signal 114, which can cause victim vehicle 104 to detect a ghost vehicle 112 based on signal 108 and attacker signal 114. Victim vehicle 104 may also detect attacker vehicle 106 based on signal 108 and reflection 110. In particular, attacker vehicle 106 can transmit attacker signal 114 based on mimicking, or spoofing, the waveform of signal 108 in order to induce detection of ghost vehicle 112. Furthermore, attacker vehicle 106 can control the time offset of the attacker signal 114 in order to affect the range or distance with which victim vehicle 104 detects ghost vehicle 112.

The present disclosure provides system (e.g., refer to FIG. 2), which can be implemented by a vehicle, such as victim vehicle 104, in order to distinguish actual targets (e.g., attacker vehicle 106) from ghost targets (e.g., ghost vehicle 112).

Figure 2:
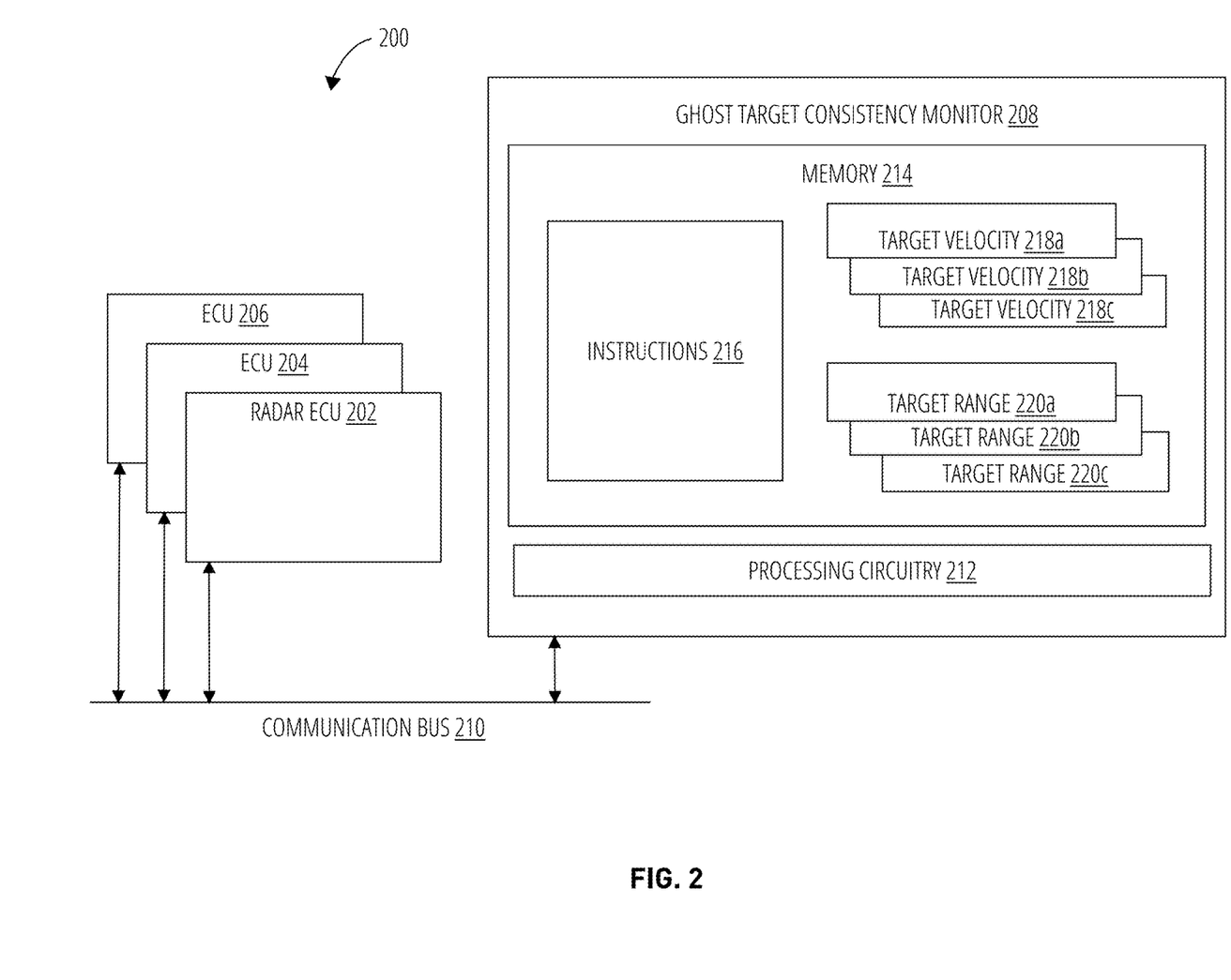
FIG. 2 illustrates a system 200 for a vehicle to detect ghost target, in accordance with non-limiting example(s) of the present disclosure.

FIG. 2 illustrates an example vehicle system 200, in accordance with non-limiting example(s) of the present disclosure. In general, system 200 can be implemented in any device where range sensing systems are used to provide for the ghost target detection disclosed herein. System 200 includes a number of electronic control units (ECUs), for example, ECU 202, ECU 204, and ECU 206, and ghost target consistency monitor 208. ECU 202, ECU 204, and ECU 206 are coupled to ghost target consistency monitor 208 via a communication bus 210. Communication bus 210 can be an in-vehicle network (IVN), such as, a CAN bus, a FlexRay bus, a CAN FD bus, an automotive ethernet bus, or a local interconnected network (LIN) bus. Additionally, where implemented in contexts outside of the automotive space, the communication bus 210 can be a network bus adapted to the particular implementation, such as, for example, a communication network for manufacturing equipment, or the like. Furthermore, although depicted herein as a wired bus, communication bus 210 could be a wireless communication bus.

In general, each of ECU 202, ECU 204, and ECU 206 include circuitry arranged to generate messages and transmit the messages onto communication bus 210 and/or consume messages from communication bus 210. The depicted ECUs (e.g., ECU 202, ECU 204, and ECU 206) can be any of a variety of devices, such as, for example, sensor devices, actuator devices, microprocessor control devices, or the like. As a specific example, ones of the ECUs 202, 204, and 206 can a collision avoidance ECU, an automated braking ECU, a steering angle ECU, a heating and cooling ECU, an engine management ECU, or the like. At least one of the ECUs will be a radar ECU. For example, ECU 202 is depicted as radar ECU. In general, radar ECU 202 can be coupled to hardware (e.g., circuitry, antennas, etc.) and arranged to transmit and receive radar signals (e.g., signal 108, reflection 110, attacker signal 114, or the like).

In general, ghost target consistency monitor 208 is arranged to distinguish ghost targets from legitimate targets outside the radar sensing pipeline. Said differently, ghost target consistency monitor 208 is radar technology agnostic. As such, system 200 can be implemented in a variety of vehicles independent of the radar sensing technology utilized by the vehicle. With some examples, system 200, or rather ghost target consistency monitor 208, can be implemented in an intrusion detection system (IDS) of a vehicle.

Ghost target consistency monitor 208 includes memory 214 and processing circuitry 212. Memory 214 includes instructions 216 (e.g., firmware, or the like) that can be executed by processing circuitry 212. Memory 214 further includes target velocities 218a, 218b, and 218c as well as target ranges 220a, 220b, and 220c. During operation, processing circuitry 212 can execute instructions 216 to utilize a target's signature in the range-Doppler domain to distinguish ghosts from legitimate targets. More particularly, processing circuitry 212 can execute instructions 216 to receive target velocities 218a, 218b, and 218c as well as target ranges 220a, 220b, and 220c from a radar subsystem of 200 (e.g., ECU 202, or the like).

In general, processing circuitry 212 can execute instructions 216 to distinguish an actual target (e.g., attacker vehicle 106) from a ghost target (e.g., ghost vehicle 112, or the like) based on the received target velocities (e.g., target velocities 218a, 218b, 218c) and target ranges (e.g., target ranges 220a, 220b, and 220c). This is explained in greater detail below. However, in general, the present disclosure distinguishes ghost targets from actual targets as the radar signal associated with the ghost targets is subject to one-way propagation whereas radar signals from legitimate (actual) targets are subject to two-way propagation. Processing circuitry 212 executes instructions 216 to first identify which signals may be subject to one-way propagations and then performs controlled perturbations of the vehicle speed while monitoring the targets' radar detection signature to confirm that the target is in fact a ghost at block 312 of FIG. 3.

Memory 214 can be based on any of a wide variety of information storage technologies. For example, memory 214 can be based on volatile technologies requiring the uninterrupted provision of electric power or non-volatile technologies that do not require uninterrupted power and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 214 can include storage devices.

Processing circuitry 212 can include any of a variety of processors, such as, for example, commercial central processing units, application specific integrated circuits, or the like. Processing circuitry 212 can be a microprocessor or a commercial processor and can include one or multiple processing core(s) and can also include cache.

Figure 3:
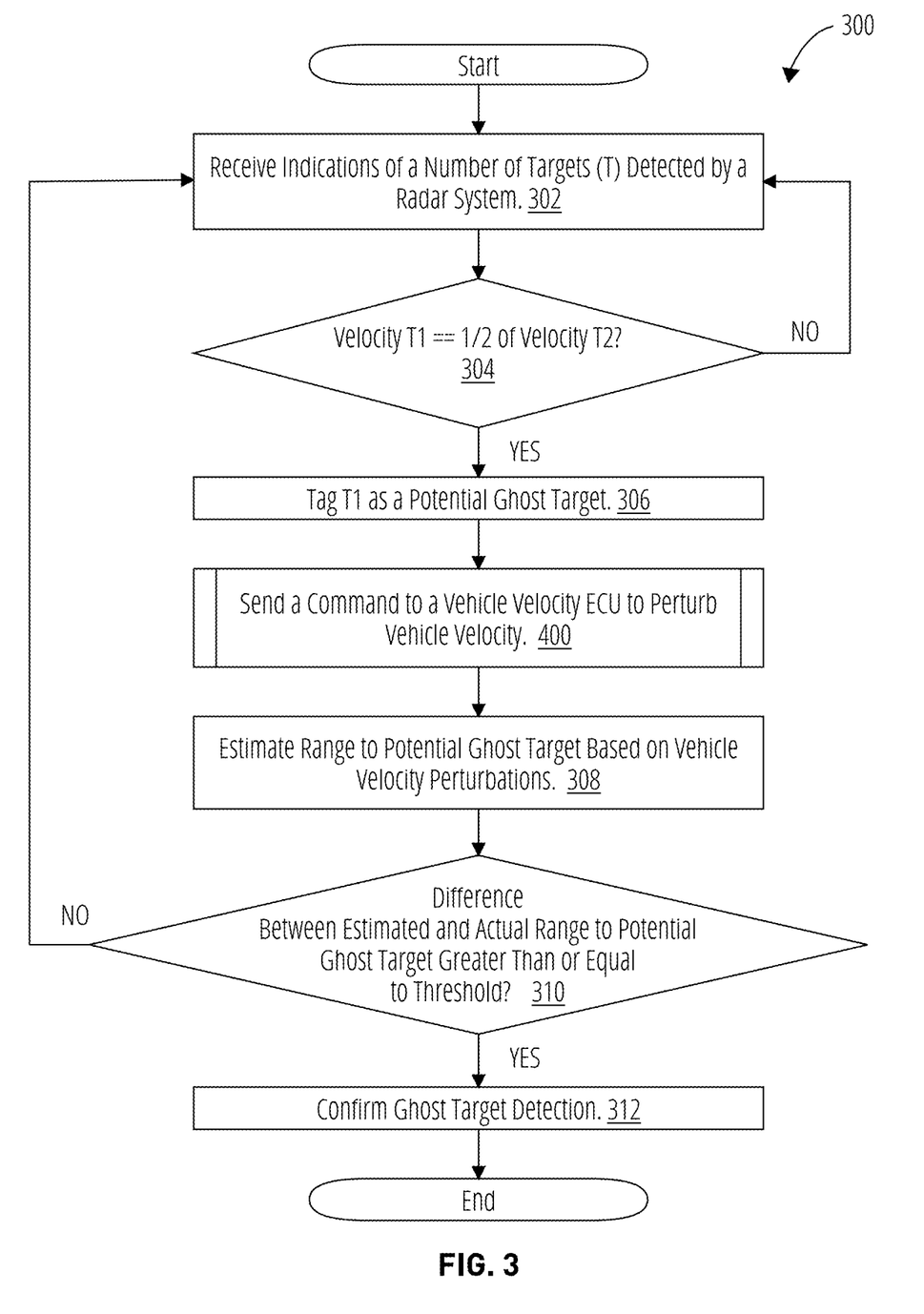
FIG. 3 illustrates a routine 300 to distinguish ghost targets from legitimate targets, in accordance with non-limiting example(s) of the present disclosure.

FIG. 3 depicts a routine 300, in accordance with non-limiting example(s) of the present disclosure. The routines and logic flows described herein, including routine 300, and other logic flows or routines described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Routine 300 can be implemented by an intrusion detection system (IDS) or other system arranged to distinguish ghost targets from real targets based on radar range signals. For example, routine 300 can be implemented by ghost target consistency monitor 208 of system 200, which itself can be implemented in a vehicle (e.g., victim vehicle 104, or the like). Routine 300 can begin at block 302 "receive indications of a number of targets (T) detected by a radar system" where an IDS can receive indications of a number of targets detected by a radar system. For example, processing circuitry 212 can execute instructions 216 to receive information elements comprising indications of target velocities 218a, 218b, and 218c as well as target ranges 220a, 220b, and 220c. With some examples, routine 300 can further include transmitting, or sending a control signal to cause a radar transmitter to transmit radar signals and to cause a radar receiver to receive radar signals, which can include both reflections based on the transmitted radar signal as well as attack signals generated by an attacker vehicle (e.g., attacker vehicle 106, or the like). It is noted that a number of radar technologies exists, and the present disclosure does not attempt to fully described them. However, those of skill in the art are to appreciate that the ghost target distinguishing techniques disclosed herein are independent of the actual radar technology used to generate the indications received at block 302.

Continuing to decision block 304 "velocity T1==½ of velocity T2?" where an IDS can determine whether the velocity of a first target (e.g., T1) represented by the number of targets received at block 302 is equal to one-half (½) the velocity of a second target (e.g., T2) represented by the number of targets received at block 302. For example, processing circuitry 212 can execute instructions 216 to determine whether any one of target velocities 218a, 218b or 218c is equal to ½ of another one of the target velocities. As a specific example, assume target velocity 218a was associated with the target velocity for ghost vehicle 112 while 218c was associated with the target velocity for attacker vehicle 106. At decision block 304, processing circuitry 212 can execute instructions 216 to determine that target velocity 218a is equal to ½ target velocity 218c.

It is important to note that the Doppler velocity measurement magnitude of the artificially created ghost object (e.g., ghost vehicle 112) is one half of the Doppler velocity measurement magnitude of the legitimate object (e.g., attacker vehicle 106) where the spoofing transmitter is located. As such, the determination at decision block 304 is a simple first check to detect ghost objects.

From decision block 304, routine 300 can continue to block 306 or return to block 302. In particular, routine 300 can continue to block 306 from decision block 304 based on a determination at decision block 304 that the first target velocity equals one-half the second target velocity (T1=½ T2) while routine 300 can return to block 302 from decision block 304 based on a determination at decision block 304 that the first target velocity does not equal one-half the second target velocity (T1≠½ T2).

Figure 4:
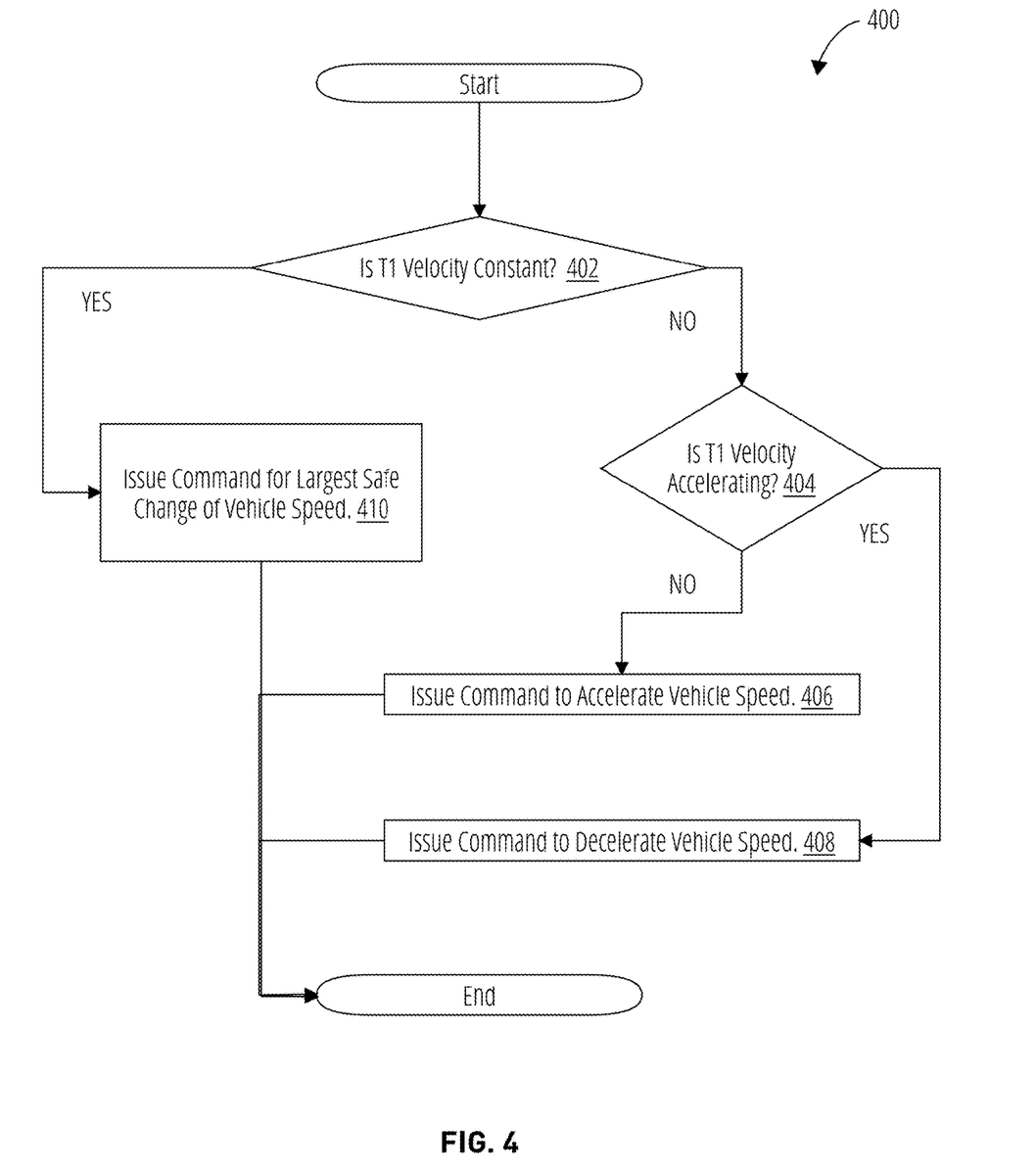
FIG. 4 illustrates a subroutine block 400 of routine 300, in accordance with non-limiting example(s) of the present disclosure.

At block 306 "tag T1 as a potential ghost target" the IDS can tag the target T1 as a potential ghost target. For example, processing circuitry 212 can execute instructions 216 to tag the target associated with T1 (e.g., ghost vehicles 112 which is associated with target velocity 218a, or the like) as a potential ghost target. Continuing to subroutine block 400 "send a command to vehicle control ECU to perturb vehicle velocity" the IDS can send a command to a vehicle control ECU to perturb the vehicle velocity, thereby inducing a change in distance between the vehicle and the number of targets. For example, processing circuitry 212 can execute instructions 216 to send a command to one of the ECUs (e.g., accelerator ECU, or the like) to perturb the vehicle velocity.

Continuing to block 308 "estimate range to potential ghost target based on vehicle velocity perturbations" the IDS can estimate the range to the potential ghost target based on the perturbed vehicle velocity and the last measured range of the potential ghost target. For example, processing circuitry 212 can execute instructions 216 to estimate the potential ghost targets range using the following formula: $\tilde{r}_{potentialghost(k)} = \tilde{r}_{potentialghost(k-1)} + \tilde{v}_{potentialghost(k)} T_s$, where k is the time step, Ts is the inter-arrival time of radar measurements, r is range, v is velocity, and where $$\tilde{r}_{potentialghost(0)} = \tilde{r}_{potentialghostmeasured(0)}.$$

It is noted, that the operations of subroutine block 400 and bock 308 associated with the velocity perturbation, or in other words the diagnostic maneuver, provide for the victim vehicle 104 to distinguish behavior of the potential ghost vehicle from the attacker vehicle 106 by utilizing unaffected Doppler measurements to estimate potential ghost target's velocity without relying on the spoofed range measurements.

Continuing to decision block 310 "difference between estimated and actual range to potential ghost target greater than or equal to threshold?" the IDS can determine whether the difference between the actual range to the potential ghost target (e.g., $\tilde{r}_{potentialghost\ measured}$) and the estimated range to the potential ghost target (e.g., $\tilde{r}_{potentialghost}$) is greater than or equal to a threshold. For example, processing circuitry 212 can execute instructions 216 to determine whether a difference between estimated range to the potential ghost target derived at block 308 and the measured range to the potential ghost target exceeds a threshold value. In some examples, the threshold value can be a percentage of the range. For example, where the range is 50 meters the threshold may be 5 meters, 10 meters, 15 meters, or the like. As another example, the threshold value may be chosen in accordance with the declared radar sensor range measurement noise (e.g., the inaccuracy of the radar sensor range measurement). In such an example, the threshold value may be adjusted high enough to ensure robustness to measurement noise, but low enough to maximize detection rate.

It is noted that the present disclosure may be limited based on the attacker adjusting the radar signal transmission time offset. For example, during the diagnostic maneuver, or perturbation of vehicle speed (e.g., for $k_{max}*T_s$) if the attacker adjusts the speed or range of the signal transmitted to appear as the ghost target (e.g., based on adjusting the time offset of radar Tx, or the like), the difference between the estimated and measured ranges may not exceed the threshold. In such a case, other evasive or safety maneuvers may be implemented where possible (e.g, lateral lane shift, deceleration to stop, or the like).

FIG. 4 illustrates a subroutine block 400 that can be implemented by an IDS as part of a larger routine to distinguish a ghost target from an actual target (e.g., routine 300, or the like). Subroutine block 400 can begin at decision block 402 "is T1 velocity constant?" where an IDS can determine whether the velocity of the potential ghost target is constant. For example, processing circuitry 212 can execute instructions 216 to determine whether the velocity of the potential ghost target is constant. For example, for the last number (n) time frames, if the velocity of the potential ghost target changed less than or equal to a threshold amount (e.g., 2%, 5%, 10%, or the like) it may be considered constant. Alternatively, the velocity of the potential ghost target may be accelerating or decelerating.

It is noted that the efficiency of the diagnostic maneuver associated with the velocity perturbation increases with increasing relative change of movement between the victim vehicle and the potential ghost and attacker vehicles. As such, the diagnostic maneuver of which subroutine block 400 is associated ideally includes acceleration with magnitude opposite to (e.g., negative value of) the attacker's vehicle acceleration.

From decision block 402, subroutine block 400 can continue to either block 410 or decision block 404. In particular, subroutine block 400 can continue from decision block 402 to block 410 based on a determination at decision block 402 that the velocity of the potential ghost target is constant while subroutine block 400 can continue from decision block 402 to decision block 404 based on determination at decision block 402 that the velocity of the potential ghost target is not constant.

At block 410 "issue a command for the largest safe change of vehicle speed" the IDS can issue a command for the largest safe change of the vehicle speed. For example, where the vehicle does not have any vehicles behind it, an abrupt deceleration may be the largest safe change to vehicle speed. In such an example, processing circuitry 212 can execute instructions 216 to send a command to one (or more) of the ECUs (e.g., accelerator ECU, braking ECU, or the like) to cause the abrupt deceleration of the vehicle speed.

At decision block 404 "is T1 velocity accelerating?" the IDS can determine whether the velocity of the potential ghost target is accelerating. For example, processing circuitry 212 can execute instructions 216 to determine whether the potential ghost target is accelerating (e.g., based on prior measurements of the velocity of the potential ghost target, or the like). From decision block 404, subroutine block 400 can continue to either block 406 or block 408. In particular, subroutine block 400 can continue from decision block 404 to block 406 based on a determination at decision block 404 that the velocity of the potential ghost target is not accelerating while subroutine block 400 can continue from decision block 404 to decision block 408 based on determination at decision block 404 that the velocity of the potential ghost target is accelerating.

At block 406 "issue a command to accelerate vehicle speed" the IDS can issue a command to accelerate the vehicle speed. For example, processing circuitry 212 can execute instructions 216 to send a command to one (or more) of the ECUs (e.g., accelerator ECU, braking ECU, or the like) to cause the vehicle speed to be accelerated. It is noted that at block 406, commands to perform a diagnostic maneuver are issued. In some examples, the command can be to accelerate the vehicle speed as explained herein. However, in other examples, the command can be to decelerate the vehicle, to perform a lateral movement (e.g., lane change, or the like), or perform some other diagnostic maneuver determined "safe" by the vehicle controller. As a specific example, an abrupt acceleration may not be "safe" where a vehicle (even a potential ghost vehicle) is within a threshold distance in front of the victim vehicle. In such an example, the vehicle controller may determine that a lateral movement (e.g., lane change) is the safest abrupt maneuver. Accordingly, although vehicle speed perturbation is used as an example through this disclosure, the diagnostic maneuver may include a lateral shift, both a lateral shift and a vehicle speed perturbation, or merely a vehicle speed perturbation.

At block 408 "issue a command to decelerate vehicle speed" the IDS can issue a command to decelerate the vehicle speed. For example, processing circuitry 212 can execute instructions 216 to send a command to one (or more) of the ECUs (e.g., accelerator ECU, braking ECU, or the like) to cause the vehicle speed to be decelerated.

Figure 5:
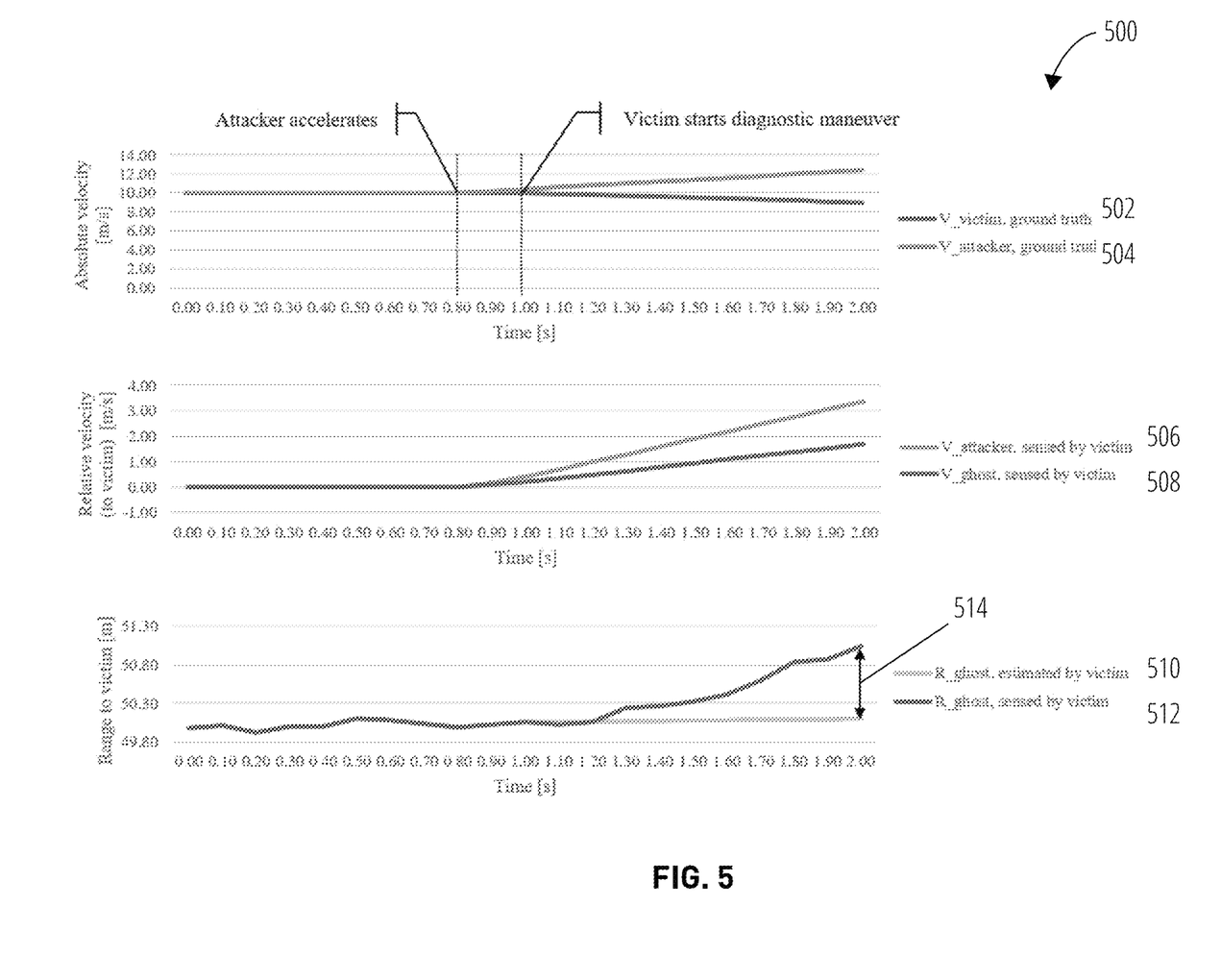
FIG. 5 illustrates a number of plots 500, in accordance with non-limiting example(s) of the present disclosure.

FIG. 5 depicts a number of plots 500 showing attacker vehicle absolute velocity 502 and victim vehicle absolute velocity 504. As outlined above, a diagnostic maneuver is performed where the velocity of the victim vehicle is adjusted. Such a change in the velocity of the victim vehicle causes a corresponding change in the relative velocity between the victim vehicle and the attacker vehicle (e.g., relative velocity 506) as well as between the victim vehicle and the potential ghost target (e.g., relative velocity 508).

Furthermore, the diagnostic maneuver causes a change in the sensed range 510 relative to the estimated range 512. Where the difference 514 between the sensed range 510 and the estimated range 512 is larger than the threshold value, the potential ghost target is confirmed as a ghost target at block 312 of FIG. 3.

Figure 6:
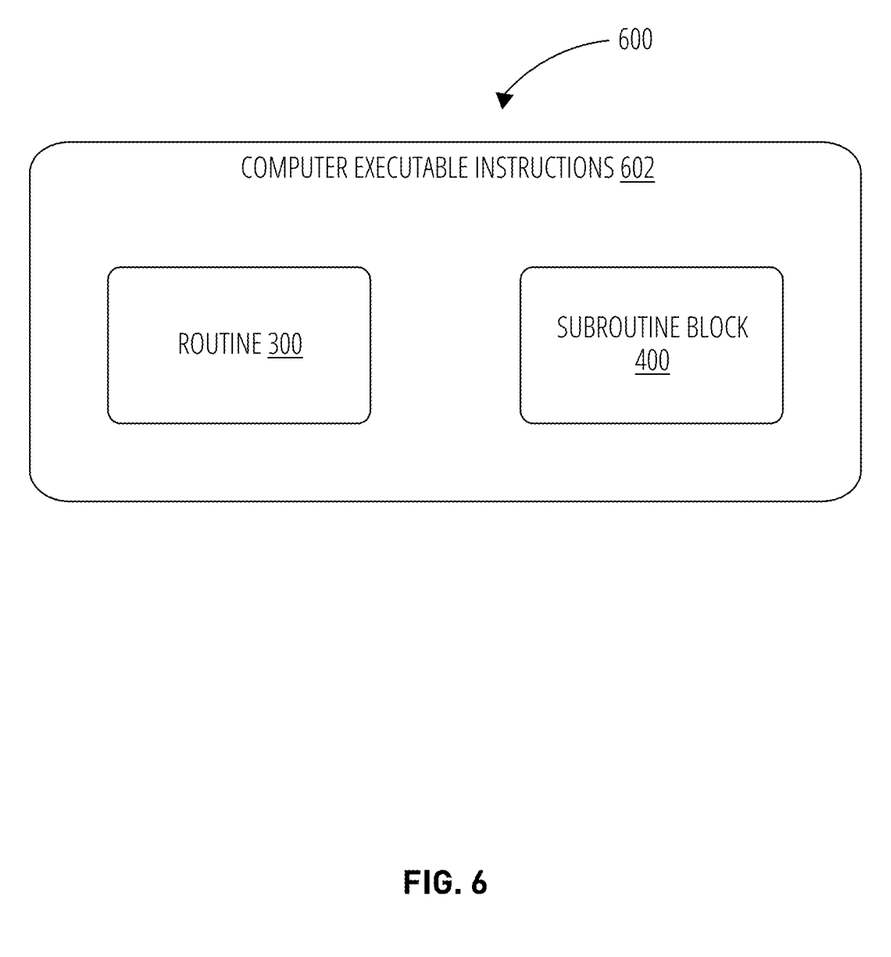
FIG. 6 illustrates a storage device 600, in accordance with non-limiting example(s) of the present disclosure.

FIG. 6 illustrates an example of a storage device 600. Storage device 600 may comprise an article of manufacture, such as, any non-transitory computer readable medium or machine readable medium, such as an optical, magnetic or semiconductor storage. Storage device 600 may store various types of computer executable instructions 602, such as instructions to implement routine 300 and/or subroutine block 400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
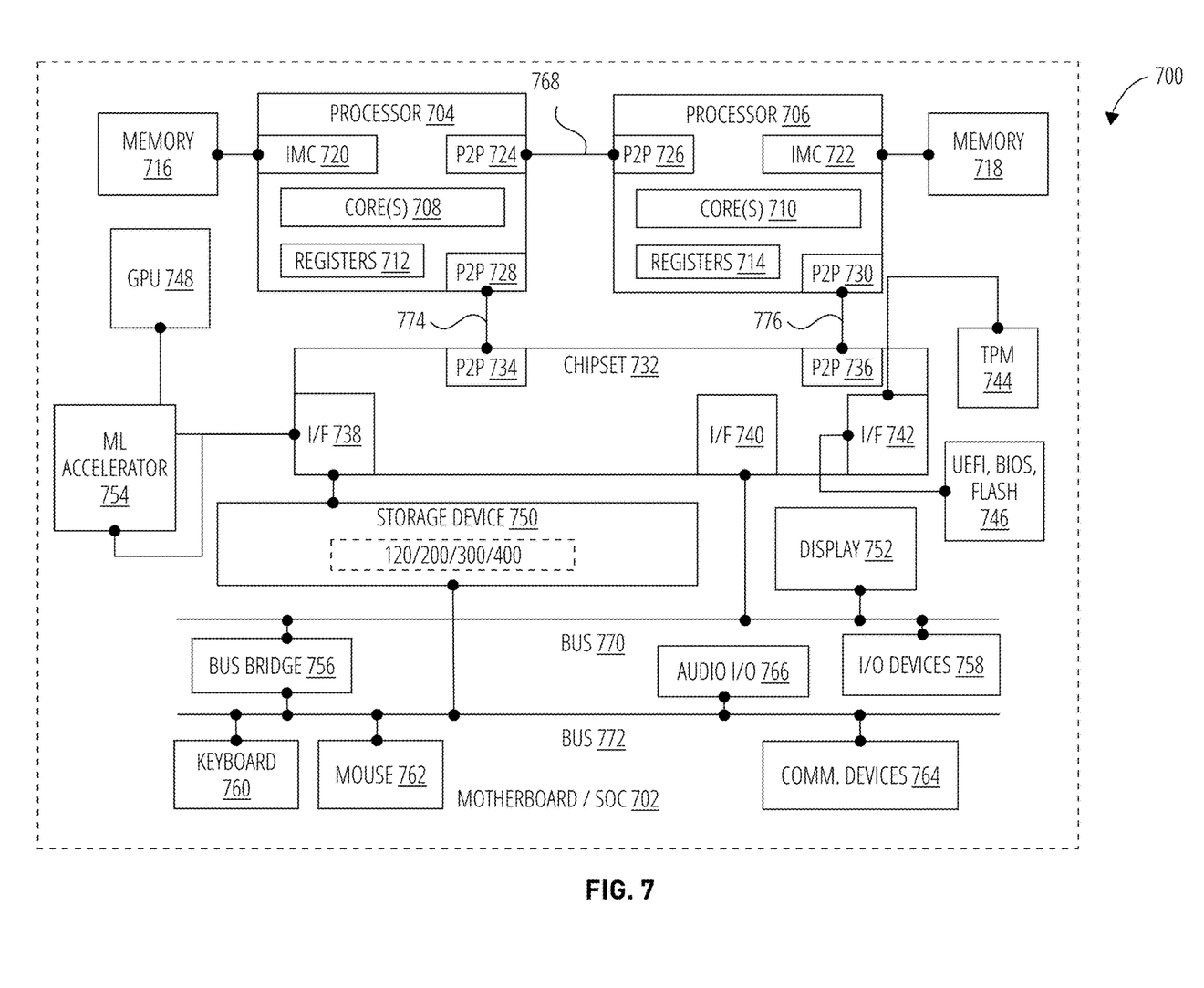
FIG. 7 illustrates a system 700, in accordance with non-limiting example(s) of the present disclosure.

FIG. 7 illustrates an embodiment of a system 700. System 700 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 700 may have a single processor with one core or more than one processor. Note that the term "processor" refers to a processor with a single core or a processor package with multiple processor cores. In at least one embodiment, the computing system 700 is representative of the components of the victim vehicle 104, system 200, and/or ghost target consistency monitor 208. More generally, the computing system 700 is configured to implement all logic, systems, logic flows, methods, apparatuses, and functionality described herein. As a specific example, system 700 can be implemented as part of intrusion detection system and arranged to implement the feature of distinguishing a ghost from an actual target as described herein.

As used in this application, the terms "system" and "component" and "module" are intended to refer to a computer-related entity, either hardware, a combination of hardware and software, software, or software in execution, examples of which are provided by the exemplary system 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 700 comprises a motherboard or system-on-chip (SoC) 702 for mounting platform components. Motherboard or system-on-chip (SoC) 702 is a point-to-point (P2P) interconnect platform that includes a first processor 704 and a second processor 706 coupled via a point-to-point interconnect 768 such as an Ultra Path Interconnect (UPI). In other embodiments, the system 700 may be of another bus architecture, such as a multi-drop bus. Furthermore, each of processor 704 and processor 706 may be processor packages with multiple processor cores including core(s) 708 and core(s) 710, respectively. While the system 700 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 704 and chipset 732. Some platforms may include additional components and some platforms may include sockets to mount the processors and/or the chipset. Furthermore, some platforms may not have sockets (e.g. SoC, or the like).

The processor 704 and processor 706 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processor 704 and/or processor 706. Additionally, the processor 704 need not be identical to processor 706.

Processor 704 includes register registers 712, integrated memory controller (IMC) 720 and point-to-point (P2P) interface 724 and P2P interface 728. Similarly, the processor 706 includes register registers 714, IMC 722 as well as P2P interface 726 and P2P interface 730. IMC 720 and IMC 722 couple the processors processor 704 and processor 706, respectively, to respective memories (e.g., memory 716 and memory 718). Memory 716 and memory 718 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 716 and memory 718 locally attach to the respective processors (i.e., processor 704 and processor 706). In other embodiments, the main memory may couple with the processors via a bus and shared memory hub.

System 700 includes chipset 732 coupled to processor 704 and processor 706. Furthermore, chipset 732 can be coupled to storage device 750, for example, via an interface (I/F) 738. The I/F 738 may be, for example, a Peripheral Component Interconnect-enhanced (PCI-e).

Processor 704 couples to a chipset 732 via P2P interface 728 and P2P 734 while processor 706 couples to a chipset 732 via P2P interface 730 and P2P 736. Direct media interface (DMI) 774 and DMI 776 may couple the P2P interface 728 and the P2P 734 and the P2P interface 730 and P2P 736, respectively. DMI 774 and DMI 776 may be a high-speed interconnect that facilitates, e.g., eight Giga Transfers per second (GT/s) such as DMI 3.0. In other embodiments, the processor 704 and processor 706 may interconnect via a bus.

The chipset 732 may comprise a controller hub such as a platform controller hub (PCH). The chipset 732 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 732 may comprise more than one controller hub such as a chipset with a memory controller hub, a graphics controller hub, and an input/output (I/O) controller hub.

In the depicted example, chipset 732 couples with a trusted platform module (TPM) 744 and UEFI, BIOS, FLASH circuitry 746 via I/F 742. The TPM 744 is a dedicated microcontroller designed to secure hardware by integrating cryptographic keys into devices. The UEFI, BIOS, FLASH circuitry 746 may provide pre-boot code.

Furthermore, chipset 732 includes the I/F 738 to couple chipset 732 with a high-performance graphics engine, such as, graphics processing circuitry or a graphics processing unit (GPU) 748. In other embodiments, the system 700 may include a flexible display interface (FDI) (not shown) between the processor 704 and/or the processor 706 and the chipset 732. The FDI interconnects a graphics processor core in one or more of processor 704 and/or processor 706 with the chipset 732. Additionally, ML accelerator 754 coupled to chipset 732 via I/F 738. ML accelerator 754 can be circuitry arranged to execute ML related operations (e.g., training, inference, etc.) for ML models. In particular, ML accelerator 754 can be arranged to execute mathematical operations and/or operands useful for machine learning.

Various I/O devices 758 and display 752 couple to the bus 770, along with a bus bridge 756 which couples the bus 770 to a second bus 772 and an I/F 740 that connects the bus 770 with the chipset 732. In one embodiment, the second bus 772 may be a low pin count (LPC) bus. Various devices may couple to the second bus 772 including, for example, a keyboard 760, a mouse 762 and communication devices 764.

Furthermore, an audio I/O 766 may couple to second bus 772. Many of the I/O devices 758 and communication devices 764 may reside on the motherboard or system-on-chip (SoC) 702 while the keyboard 760 and the mouse 762 may be add-on peripherals. In other embodiments, some or all the I/O devices 758 and communication devices 764 are add-on peripherals and do not reside on the motherboard or system-on-chip (SoC) 702.

Figure 8:
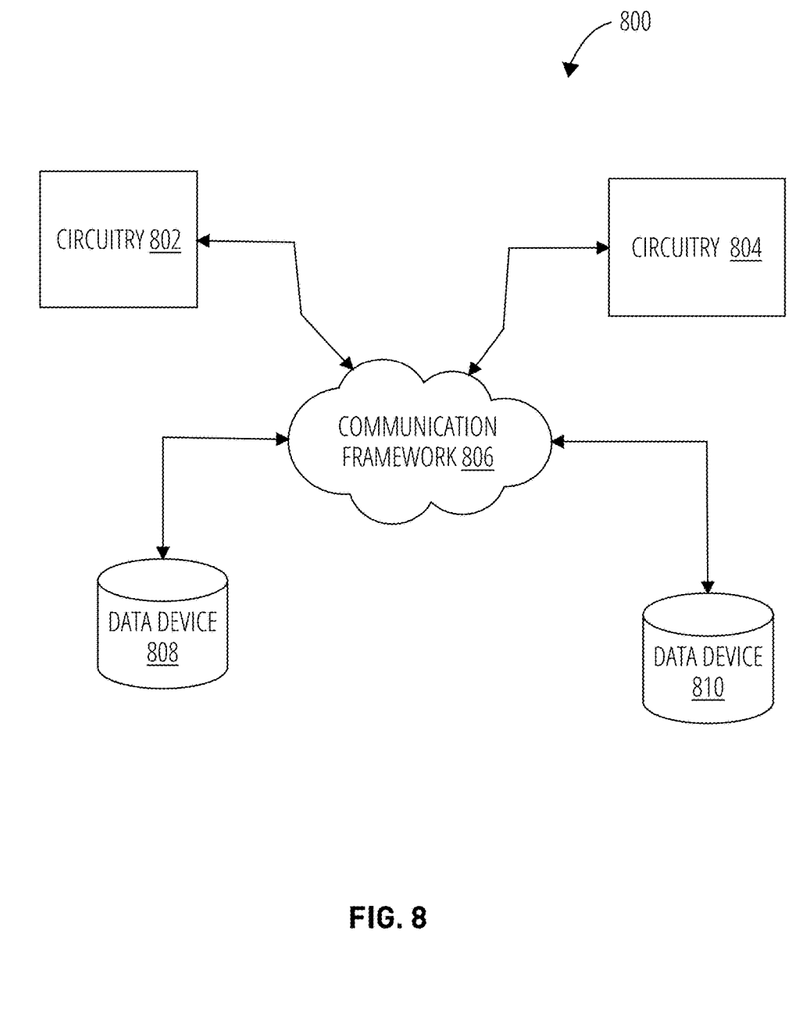
FIG. 8 illustrates an in-vehicle communication architecture 800 in accordance with non-limiting example(s) of the present disclosure.

FIG. 8 illustrates an in-vehicle communication architecture 800 according to one or more embodiments of the disclosure. For example, one or more vehicular devices, components, or circuits, such as circuitry 802 and/or circuitry 804, may communicate with each other via a communication framework 806, which may be an in-vehicle network, such as a CAN bus, implemented to facilitate the context based attacking mitigation techniques described herein.

The in-vehicle communication architecture 800 includes various common communications elements, such as a transmitter, receiver, transceiver, and so forth. The embodiments, however, are not limited to implementation by the in-vehicle communication architecture 800. As shown in this figure, the vehicular circuitry 802 and circuitry 804 may each be operatively connected to one or more respective data devices, such as, data device 808 and/or data device 810 that can be employed to store information local to the respective circuitry 802 and/or circuitry 804, such as radar signals, trajectories, velocities, ranges, or the like. It may be understood that the circuitry 802 and circuitry 804 may be any suitable vehicular component, such as sensor, an ECU, microcontroller, microprocessor, processor, ASIC, field programmable gate array (FPGA), any electronic device, computing device, or the like. Moreover, it may be understood that one or more computing devices (containing at least a processor, memory, interfaces, etc.) may be connected to the communication framework 806 in a vehicle.

Further, the communication framework 806 may implement any well-known communications techniques and protocols. As described above, the communication framework 806 may be implemented as a CAN bus protocol or any other suitable in-vehicle communication protocol. The communication framework 806 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 806 may employ both wired and wireless connections.

The components and features of the devices described above may be implemented using any combination of: processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments have more features than are expressly recited in each claim. Rather, as the following claims reflect, the described subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The following examples pertain to further embodiments, from which numerous permutations and configurations will be apparent.

Example 1

A computing apparatus comprising: a processor at an intrusion detection system of a vehicle; and memory storing instructions, which when executed by the processor configure the apparatus to: receive an indication of a range and a velocity of a plurality of targets based on radar signals; tag a first one of the plurality of targets as a potential ghost target based on the velocity of the plurality of targets; issue a command to cause a perturbation of the speed of the vehicle; receive an indication of an updated range of the first one of the plurality of targets; and confirm the potential ghost target as an actual ghost target based on the range of the first one of the plurality of targets and the updated range of the first one of the plurality of targets.

Example 2

The computing apparatus of example 1, the instructions when executed by the processor configure the apparatus to: determine whether the velocity of the first one of the plurality of targets is ½ the velocity of another one of the plurality of targets; and tag the first one of the plurality of targets as the potential ghost target based on a determination that the velocity of the first one of the plurality of targets is ½ the velocity of another one of the plurality of targets.

Example 3

The computing apparatus of example 1, the instructions when executed by the processor configure the apparatus to: determine whether the velocity of the first one of the plurality of targets is constant over a specific number of time periods; identify a change in vehicle velocity based on a determination that the velocity of the first one of the plurality of targets is constant over the specific number of time periods; and generate a command to cause the change in vehicle velocity.

Example 4

The computing apparatus of example 3, the instructions when executed by the processor configure the apparatus to send the command to one or more electronic control units (ECUs) of the vehicle via an in-vehicle bus.

Example 5

The computing apparatus of example 4, the one or more ECUs comprising an accelerator ECU, a braking ECU, or a velocity ECU.

Example 6

The computing apparatus of example 2, the instructions when executed by the processor configure the apparatus to: derive an estimated updated range of the first one of the plurality of ghost targets based on the range and the velocity of the first one of the plurality of ghost targets; derive a difference between the estimated updated range and the updated range; determine whether the difference is greater than or equal to a threshold value; and confirm the potential ghost target as the actual ghost target based on a determination that the different is greater than or equal to the threshold value.

Example 7

The computing apparatus of example 2, the instructions when executed by the processor configure the apparatus to derive the estimated updated range of the first one of the plurality of ghost targets based on the range and the velocity of the first one of the plurality of ghost targets and an inter-arrival time of the radar signals.

Example 8

A method, comprising: receiving, at an intrusion detection system (IDS) of a vehicle, an indication of a range and a velocity of a plurality of targets based on radar signals; tagging a first one of the plurality of targets as a potential ghost target based on the velocity of the plurality of targets; issuing a command to cause a perturbation of the speed of the vehicle; receiving an indication of an updated range of the first one of the plurality of targets; and confirming the potential ghost target as an actual ghost target based on the range of the first one of the plurality of targets and the updated range of the first one of the plurality of targets.

Example 9

The method of example 8, comprising: determining whether the velocity of the first one of the plurality of targets is ½ the velocity of another one of the plurality of targets; and tagging the first one of the plurality of targets as the potential ghost target based on determining that the velocity of the first one of the plurality of targets is ½ the velocity of another one of the plurality of targets.

Example 10

The method of example 8, comprising: determining whether the velocity of the first one of the plurality of targets is constant over a specific number of time periods; identifying a change in vehicle velocity based on determining that the velocity of the first one of the plurality of targets is constant over the specific number of time periods; and generating a command to cause the change in vehicle velocity.

Example 11

The method of example 10, comprising sending the command to one or more electronic control units (ECUs) of the vehicle via an in-vehicle bus.

Example 12

The method of example 11, the one or more ECUs comprising an accelerator ECU, a braking ECU, or a velocity ECU.

Example 13

The method of example 9, comprising: deriving an estimated updated range of the first one of the plurality of ghost targets based on the range and the velocity of the first one of the plurality of ghost targets; deriving a difference between the estimated updated range and the updated range; determining whether the difference is greater than or equal to a threshold value; and confirming the potential ghost target as the actual ghost target based determining that the different is greater than or equal to the threshold value.

Example 14

The method of example 9, comprising deriving the estimated updated range of the first one of the plurality of ghost targets based on the range and the velocity of the first one of the plurality of ghost targets and an inter-arrival time of the radar signals.

Example 15

A non-transitory computer-readable storage medium, the computer-readable storage medium including instructions that when executed by processing circuitry of an intrusion detection system (IDS) of a vehicle, cause the IDS to: receive an indication of a range and a velocity of a plurality of targets based on radar signals; tag a first one of the plurality of targets as a potential ghost target based on the velocity of the plurality of targets; issue a command to cause a perturbation of the speed of the vehicle; receive an indication of an updated range of the first one of the plurality of targets; and confirm the potential ghost target as an actual ghost target based on the range of the first one of the plurality of targets and the updated range of the first one of the plurality of targets.

Example 16

The computer-readable storage medium of example 15, comprising instructions that when executed by the processing circuitry of the IDS, cause the IDS to: determine whether the velocity of the first one of the plurality of targets is ½ the velocity of another one of the plurality of targets; and tag the first one of the plurality of targets as the potential ghost target based on determining that the velocity of the first one of the plurality of targets is ½ the velocity of another one of the plurality of targets.

Example 17

The computer-readable storage medium of example 15, comprising instructions that when executed by the processing circuitry of the IDS, cause the IDS to: determine whether the velocity of the first one of the plurality of targets is constant over a specific number of time periods; identify a change in vehicle velocity based on determining that the velocity of the first one of the plurality of targets is constant over the specific number of time periods; and generate a command to cause the change in vehicle velocity.

Example 18

The computer-readable storage medium of example 17, comprising instructions that when executed by the processing circuitry of the IDS, cause the IDS to instructions that when executed by the processing circuitry of the IDS, cause the IDS to send the command to one or more electronic control units (ECUs) of the vehicle via an in-vehicle bus.

Example 19

The computer-readable storage medium of example 18, the one or more ECUs comprising an accelerator ECU, a braking ECU, or a velocity ECU.

Example 20

The computer-readable storage medium of example 16, comprising instructions that when executed by the processing circuitry of the IDS, cause the IDS to: derive an estimated updated range of the first one of the plurality of ghost targets based on the range and the velocity of the first one of the plurality of ghost targets; derive a difference between the estimated updated range and the updated range; determine whether the difference is greater than or equal to a threshold value; and confirm the potential ghost target as the actual ghost target based determining that the different is greater than or equal to the threshold value.

Example 21

The computer-readable storage medium of example 16, comprising instructions that when executed by the processing circuitry of the IDS, cause the IDS to derive the estimated updated range of the first one of the plurality of ghost targets based on the range and the velocity of the first one of the plurality of ghost targets and an inter-arrival time of the radar signals.

Example 22

An apparatus, comprising: means for receiving, at an intrusion detection system (IDS) of a vehicle, an indication of a range and a velocity of a plurality of targets based on radar signals; means for tagging a first one of the plurality of targets as a potential ghost target based on the velocity of the plurality of targets; means for issuing a command to cause a perturbation of the speed of the vehicle; means for receiving an indication of an updated range of the first one of the plurality of targets; and means for confirming the potential ghost target as an actual ghost target based on the range of the first one of the plurality of targets and the updated range of the first one of the plurality of targets.

Example 23

The apparatus of example 22, comprising: means for determining whether the velocity of the first one of the plurality of targets is ½ the velocity of another one of the plurality of targets; and mean for tagging the first one of the plurality of targets as the potential ghost target based on determining that the velocity of the first one of the plurality of targets is ½ the velocity of another one of the plurality of targets.

Example 24. The apparatus of example 22, comprising: means for determining whether the velocity of the first one of the plurality of targets is constant over a specific number of time periods; means for identifying a change in vehicle velocity based on determining that the velocity of the first one of the plurality of targets is constant over the specific number of time periods; and means for generating a command to cause the change in vehicle velocity.

Example 25

The apparatus of example 24, comprising means for sending the command to one or more electronic control units (ECUs) of the vehicle via an in-vehicle bus.

Example 26

The apparatus of example 25, the one or more ECUs comprising an accelerator ECU, a braking ECU, or a velocity ECU.

Example 27

The apparatus of example 23, comprising: means for deriving an estimated updated range of the first one of the plurality of ghost targets based on the range and the velocity of the first one of the plurality of ghost targets; means for deriving a difference between the estimated updated range and the updated range; means for determining whether the difference is greater than or equal to a threshold value; and means for confirming the potential ghost target as the actual ghost target based determining that the different is greater than or equal to the threshold value.

Example 28

The apparatus of example 23, comprising means for deriving the estimated updated range of the first one of the plurality of ghost targets based on the range and the velocity of the first one of the plurality of ghost targets and an inter-arrival time of the radar signals.

What is claimed is:

1. A computing apparatus comprising:
   a processor at an intrusion detection system of a vehicle; and
   memory for storing instructions, which when executed by the processor configure the apparatus to:
   receive an indication of a range and a velocity of a plurality of targets based on radar signals;
   tag a first one of the plurality of targets as a potential ghost target based on the velocity of the plurality of targets;
   issue a command to cause a perturbation of a speed of the vehicle to induce a change in distance between the vehicle and the first one of the plurality of targets as the potential ghost target;
   receive an indication of an updated range of the first one of the plurality of targets; and
   confirm the potential ghost target as an actual ghost target based on the range of the first one of the plurality of targets and the updated range of the first one of the plurality of targets.

2. The computing apparatus of claim 1, the instructions when executed by the processor configure the apparatus to:
   determine whether the velocity of the first one of the plurality of targets is half (½) the velocity of another one of the plurality of targets; and
   tag the first one of the plurality of targets as the potential ghost target based on a determination that the velocity of the first one of the plurality of targets is half (½) the velocity of another one of the plurality of targets.

3. The computing apparatus of claim 2, the instructions when executed by the processor configure the apparatus to:
   derive an estimated updated range of the first one of the plurality of ghost targets based on the range and the velocity of the first one of the plurality of ghost targets;
   derive a difference between the estimated updated range and the updated range;
   determine whether the difference is greater than or equal to a threshold value; and confirm the potential ghost target as the actual ghost target based on a determination that the different is greater than or equal to the threshold value.

4. The computing apparatus of claim 2, the instructions when executed by the processor configure the apparatus to derive the estimated updated range of the first one of the plurality of ghost targets based on the range and the velocity of the first one of the plurality of ghost targets and an inter-arrival time of the radar signals.

5. The computing apparatus of claim 1, the instructions when executed by the processor configure the apparatus to:
   determine whether the velocity of the first one of the plurality of targets is constant over a specific number of time periods;
   identify a change in vehicle velocity based on a determination that the velocity of the first one of the plurality of targets is constant over the specific number of time periods; and
   generate a command to cause the change in vehicle velocity.

6. The computing apparatus of claim 5, the instructions when executed by the processor configure the apparatus to send the command to one or more electronic control units (ECUs) of the vehicle via an in-vehicle bus.

7. The computing apparatus of claim 6, the one or more ECUs comprising an accelerator ECU, a braking ECU, or a velocity ECU.

8. A method, comprising:
   receiving, at an intrusion detection system (IDS) of a vehicle, an indication of a range and a velocity of a plurality of targets based on radar signals;
   tagging a first one of the plurality of targets as a potential ghost target based on the velocity of the plurality of targets;
   issuing a command to cause a perturbation of a speed of the vehicle to induce a change in distance between the vehicle and the first one of the plurality of targets as the potential ghost target;
   receiving an indication of an updated range of the first one of the plurality of targets; and
   confirming the potential ghost target as an actual ghost target based on the range of the first one of the plurality of targets and the updated range of the first one of the plurality of targets.

9. The method of claim 8, comprising:
   determining whether the velocity of the first one of the plurality of targets is half (½) the velocity of another one of the plurality of targets; and
   tagging the first one of the plurality of targets as the potential ghost target based on determining that the velocity of the first one of the plurality of targets is half (½) the velocity of another one of the plurality of targets.

10. The method of claim 9, comprising:
    deriving an estimated updated range of the first one of the plurality of ghost targets based on the range and the velocity of the first one of the plurality of ghost targets;
    deriving a difference between the estimated updated range and the updated range;
    determining whether the difference is greater than or equal to a threshold value; and
    confirming the potential ghost target as the actual ghost target based determining that the different is greater than or equal to the threshold value.

11. The method of claim 9, comprising deriving the estimated updated range of the first one of the plurality of ghost targets based on the range and the velocity of the first one of the plurality of ghost targets and an inter-arrival time of the radar signals.

12. The method of claim 8, comprising:
    determining whether the velocity of the first one of the plurality of targets is constant over a specific number of time periods;
    identifying a change in vehicle velocity based on determining that the velocity of the first one of the plurality of targets is constant over the specific number of time periods; and
    generating a command to cause the change in vehicle velocity.

13. The method of claim 12, comprising sending the command to one or more electronic control units (ECUs) of the vehicle via an in-vehicle bus.

14. The method of claim 13, the one or more ECUs comprising an accelerator ECU, a braking ECU, or a velocity ECU.

15. A non-transitory computer-readable storage medium, the computer-readable storage medium including instructions that when executed by processing circuitry of an intrusion detection system (IDS) of a vehicle, cause the IDS to:
    receive an indication of a range and a velocity of a plurality of targets based on radar signals;
    tag a first one of the plurality of targets as a potential ghost target based on the velocity of the plurality of targets;
    issue a command to cause a perturbation of a speed of the vehicle to induce a change in distance between the vehicle and the first one of the plurality of targets as the potential ghost target;
    receive an indication of an updated range of the first one of the plurality of targets; and
    confirm the potential ghost target as an actual ghost target based on the range of the first one of the plurality of targets and the updated range of the first one of the plurality of targets.

16. The computer-readable storage medium of claim 15, comprising instructions that when executed by the processing circuitry of the IDS, cause the IDS to:
    determine whether the velocity of the first one of the plurality of targets is half (½) the velocity of another one of the plurality of targets; and
    tag the first one of the plurality of targets as the potential ghost target based on determining that the velocity of the first one of the plurality of targets is half (½) the velocity of another one of the plurality of targets.

17. The computer-readable storage medium of claim 16, comprising instructions that when executed by the processing circuitry of the IDS, cause the IDS to:
    derive an estimated updated range of the first one of the plurality of ghost targets based on the range and the velocity of the first one of the plurality of ghost targets;
    derive a difference between the estimated updated range and the updated range;
    determine whether the difference is greater than or equal to a threshold value; and
    confirm the potential ghost target as the actual ghost target based determining that the different is greater than or equal to the threshold value.

18. The computer-readable storage medium of claim 16, comprising instructions that when executed by the processing circuitry of the IDS, cause the IDS to derive the estimated updated range of the first one of the plurality of ghost targets based on the range and the velocity of the first one of the plurality of ghost targets and an inter-arrival time of the radar signals.

19. The computer-readable storage medium of claim 15, comprising instructions that when executed by the processing circuitry of the IDS, cause the IDS to:
   determine whether the velocity of the first one of the plurality of targets is constant over a specific number of time periods;
   identify a change in vehicle velocity based on determining that the velocity of the first one of the plurality of targets is constant over the specific number of time periods; and
   generate a command to cause the change in vehicle velocity.

20. The computer-readable storage medium of claim 19, comprising instructions that when executed by the processing circuitry of the IDS, cause the IDS to instructions that when executed by the processing circuitry of the IDS, cause the IDS to send the command to one or more electronic control units (ECUs) of the vehicle via an in-vehicle bus.

21. The computer-readable storage medium of claim 20, the one or more ECUs comprising an accelerator ECU, a braking ECU, or a velocity ECU.

* * * * *